March 3, 1964 H. R. CHOPE 3,123,714

SPACE COMMUNICATION SYSTEM

Filed July 21, 1961 3 Sheets-Sheet 1

INVENTOR.
Henry R. Chope
BY
Anthony D. Cennamo
ATTORNEY

March 3, 1964 H. R. CHOPE 3,123,714

SPACE COMMUNICATION SYSTEM

Filed July 21, 1961 3 Sheets-Sheet 2

INVENTOR.
Henry R. Chope
BY
Anthony D. Cennamo
ATTORNEY

INVENTOR.
Henry R. Chope
BY
Anthony D. Cennamo
ATTORNEY 3,123,714

SPACE COMMUNICATION SYSTEM

Henry R. Chope, Columbus, Ohio, assignor to Industrial Nucleonics Corporation, a corporation of Ohio Filed July 21, 1961, Ser. No. 125,797
6 Claims. (Cl. 250—199)

This invention relates in general to space communications systems and particularly to a communication system utilizing a modulated beam of bremsstrahlung radiation.

The success of the artificial satellites and the recent entry of man into space has made it evident that interplanetary travel with either manned or unmanned vehicles is not in the too far distant future. Communication between vehicles in space is essential, however. One of the primary difficulties confronting designers of all types of space apparatus is excess weight. For communication purposes, the conventional electronic transmitting and receiving systems, although acceptable for other uses, are too cumbersome for the futuristic designs of space vehicles. X-ray communication systems have been proposed—but again these systems are of the high energy and the high voltage type. The requirements for bulky electrical power generation devices automatically eliminate utilizing the conventional X-rays for space communications.

The present invention teaches a system that utilizes a radioisotope of the beta radiation emitting type and which radiation is utilized to excite a target to generate bremsstrahlung radiation. To convey intelligence the beta radiation beam is modulated or controlled before it strikes the target. The resultant bremsstrahlung is emitted from the target similarly modulated.

Accordingly, it is a general object of the present invention to provide a new and improved space communication system.

It is another object of the present invention to provide a space communication system utilizing bremsstrahlung energy.

A further object of the present invention is to provide a space communication system that is extremely compact and lightweight in comparison to other communication systems and does not require bulky electrical power generation devices.

Other objects and features of the present invention will become apparent from the following detailed specification taken in conjunction with the drawings in which.

Figure 1:
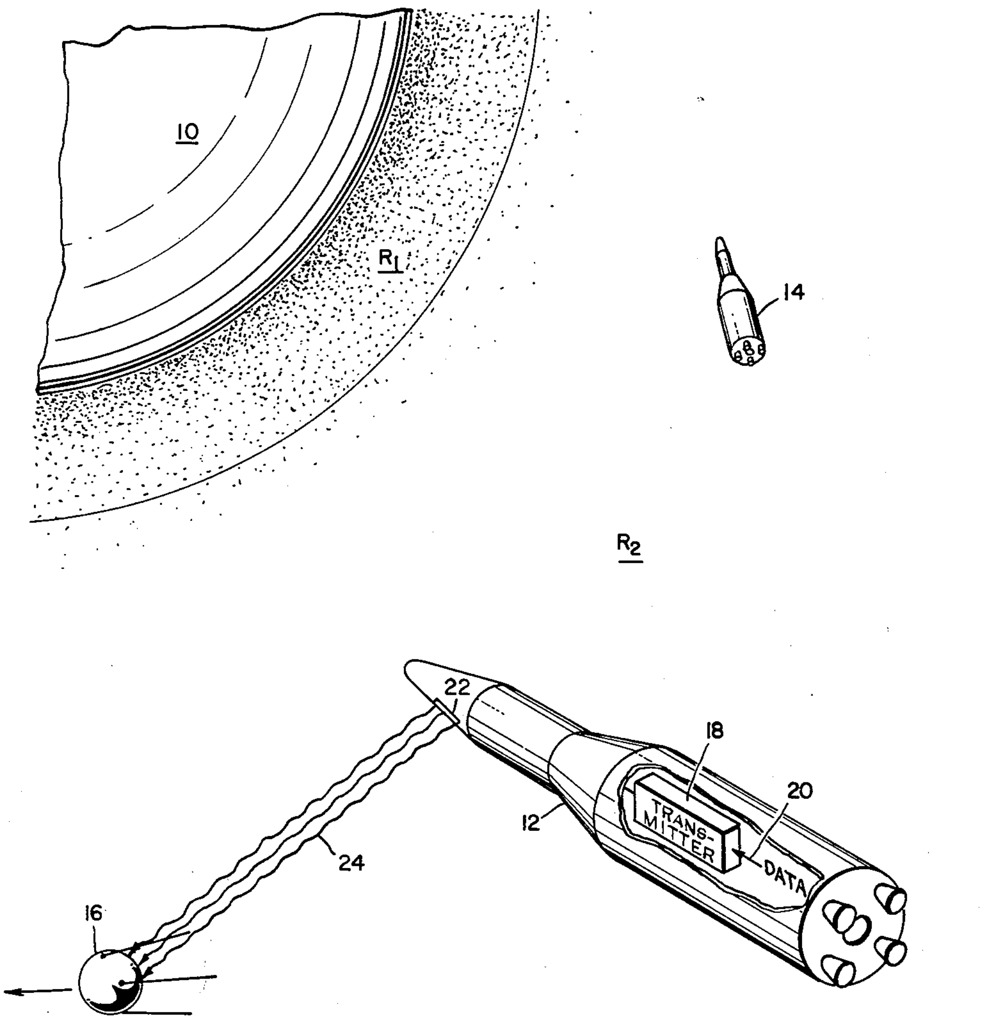
FIG. 1 is a perspective view of a space communication system comprising a preferred embodiment of the present invention.

Referring to the drawings and specifically to FIG. 1, the transmission of information from one point to another is commonly accomplished by means of electromagnetic wave propagation techniques. The maximum distance of useful transmission is limited by the absorption characteristic of the medium traversed by the wave. Frequently surrounding a celestial body 10 such as the earth is a relatively dense atmospheric region, $R_1$, wherein the energy of the transmitted wave may be absorbed. Outside these celestial bodies is a space region $R_2$ of negligible density having a correspondingly lesser attenuating effect on the transmitted wave.

Improved communication between space vehicles 12 and 14 or orbiting satellites 16 in extraterrestrial or extragalactic space is provided by the present invention. Accordingly, a transmitter of X radiation 18 receiving data 20 is coupled to a radiator 22 mounted on the vehicle 12. Data-encoded X radiation 24 is radiated toward the desired body.

Figure 2:
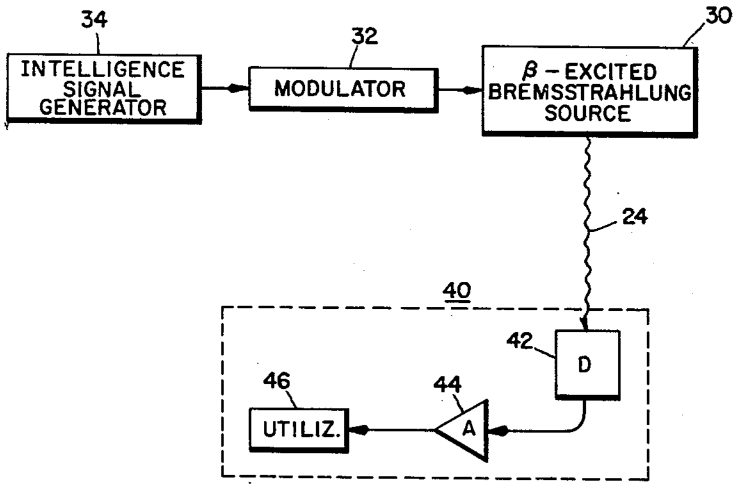
FIG. 2 is a diagrammatic illustration of the system shown in FIG. 1.

The construction of the transmitter is shown in FIG. 2 wherein the transmitter comprises a beta-excited source 30 of X-rays or bremsstrahlung radiation, a modulator 32 and an intelligence signal generator 34. The radiant energy 24 from source 30 is modulated by modulator 32 in accordance with the output of the intelligence generator 34. The modulator 32 is more fully described hereinafter.

A receiver 40 is shown in dotted outline. The radiant energy 24 is detected by a demodulator 42. Demodulator 42 may be an ionization chamber or other suitable means known in the art to derive the intelligence signal from the radiant energy 24. The signal is amplified at 44 and utilized by means 46 in a known manner and for whatever purpose the original signal was conveyed.

Figure 3:
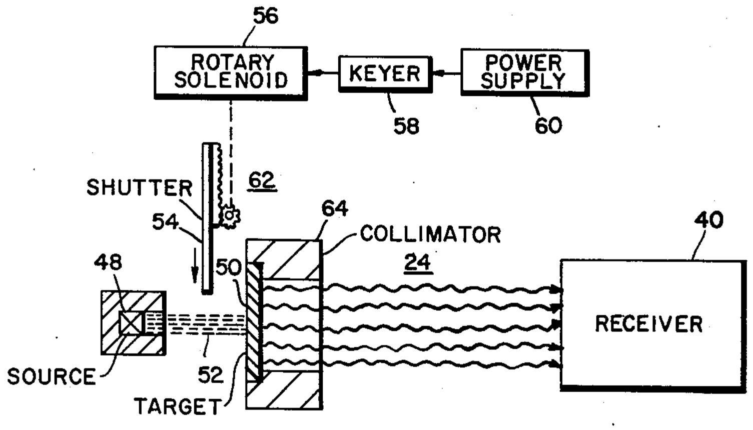
FIG. 3 is an illustration of a means for keying the radiation beam utilized in the preferred embodiment.

Referring now to FIGS. 3–6 there are shown several alternative embodiments for modifying the bremsstrahlung radiation 24 for conveying intelligence information into the system. In FIG. 3 the source 48 may be a radioisotope, such as strontium 90 or krypton 85, that emits beta particles. There is disclosed in U.S. Patent No. 2,933,606 a measuring system utilizing bremsstrahlung. Also if it is convenient to use krypton 85 as a beta source there is disclosed in U.S. Serial No. 824,107, filed June 30, 1959, now Patent No. 3,094,622, a source-target arrangement that permits the filtering out of the unwanted gamma energy. A target 50 is mounted in the beam of beta particles 52 to generate the bremsstrahlung beam 24. Interposed between the source 48 and target is a radiation opaque shutter 54. This absorber, which could be a lightweight synthetic material, is arranged to move up and down within the primary stream of beta particles so as to key the stream of beta particles in accordance with the intelligence signal. In this way the incident beta particles are intercepted before striking the target 50. Accordingly, the energy emitted into space by the target would then contain the same information as was imparted to the primary beta ray beam.

Drive means for the shutter 54 is of conventional design and would principally be a rotary solenoid device 56 controlled by a keyer 58 and power supply 60. A spur and rack gear arrangement shown generally at 62 would then impart linear motion to the absorber 54. The electrical circuits for converting a message into currents suitable for activating the solenoid 56 are also of conventional design. Beam collimating and focusing expedients 64 for concentrating the bremsstrahlung radiation in the direction of receiver 40 also form a part of the system.

Figure 4:
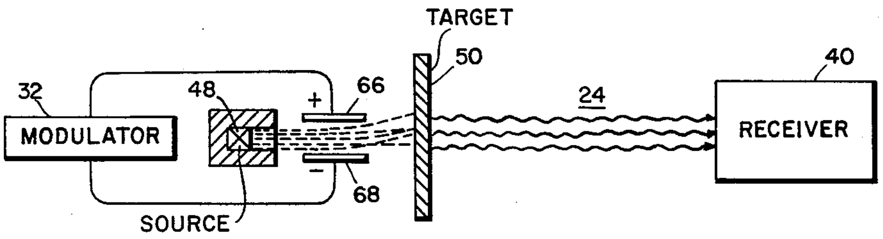
FIG. 4 is a diagrammatic view of a modulator for the system shown in FIG. 1.

To avoid the use of mechanical linkages, an alternative embodiment such as that shown in FIG. 4 may be utilized. In this embodiment the electron beam 52 is modulated in accordance with an electric field across plates 66 and 68 in response to a signal from modulator 32. This field will cause the electrons to curve into or away from the bremsstrahlung target. The modulation of the electric field with its resulting modulation in the beta beam may alternatively be amplitude, pulse, or frequency modulated.

Figure 5:
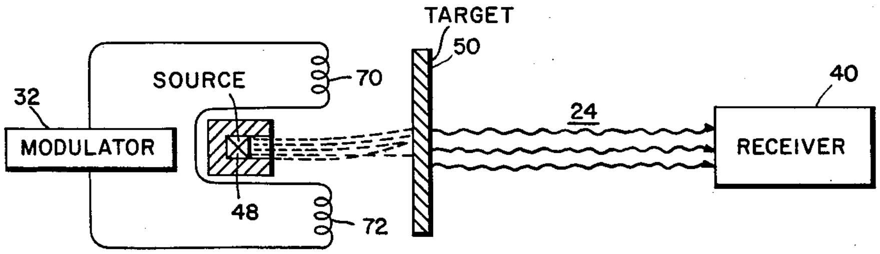
FIG. 5 is an illustration of an alternative modulating system.

Another nonmechanical modulation embodiment is shown in FIG. 5 wherein the bremsstrahlung radiation field is magnetically modulated. The beta radiation passes through a magnetic field provided by a pair of coils 70 and 72 energized by modulator 32. The amount or degree of deflection can be regulated in accordance with the intelligence signal comprising the input to modulator 32. Changes in the magnetic field in turn modulate the resultant bremsstrahlung emitted by the target 50. It should be noted the beta beam would be deflected in a plane perpendicular to the drawing; however, for purposes of facilitating the illustration, a deflection in the plane of the drawing is indicated.

Figure 6:
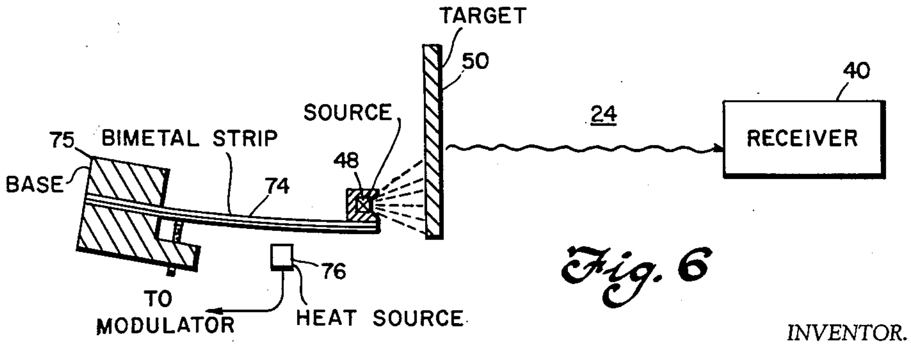
FIG. 6 is an illustration of another modulating system useful in the preferred embodiment.

Still another manner of modulating the radiation field in accordance with an intelligence signal is shown in FIG. 6. The modulating technique shown in FIG. 6 is fully disclosed in my copending application, Serial No. 56,849, filed September 19, 1960. In this embodiment the source of beta particles is mounted on a bimetallic temperature-sensitive strip 74 fixed to a base 75. A heat source 76 mounted adjacent to the strip 74 may be energized by the modulator 32 to change the angular position of the source 48 relative to the target 50. In this way more or less radiation is permitted to strike the target 50 and the amount of bremsstrahlung emitted is a function of the information contained in the intelligence signal. Alternatively, the source 48 may be fixed and the target 50 may be mounted on the bimetallic strip 74.

It should be noted that the energy spectrum of bremsstrahlung radiation 24 transmitted is determined primarily by the intensity of the originating electrons in the incident beta beam and the atomic number of the target 50. Provision may be made for changing from one target to another to concentrate most of the energy 24 in a predetermined wavelength band. The detector 42 may be rendered sensitive to this energy band by well-known techniques to improve the signal-to-noise response of the system. Likewise, targets of the same atomic number but of different thickness and shape may be utilized to control the amount of energy generated as well as the beam focusing characteristics thereof.

Although certain and specific embodiments have been shown, modifications may be made thereto without departing from the true spirit and scope of the invention.

I claim:

1. A system for conveying an intelligence signal from one point to another in a space region comprising a transmitter at one of said points including a nuclear source providing a beam of beta radiation, a target mounted in the path of said beam and adapted to generate bremsstrahlung upon bombardment of the atomic nuclei in said target by the beta particles in said beam, means for modulating the intensity of said beta radiation beam incident on said target in accordance with said intelligence signal whereby in turn the intensity of said bremsstrahlung is modulated in accordance with said signal, and a receiver at the other of said points including a detector for said bremsstrahlung radiation for demodulating the same to obtain said intelligence signal.

2. The communication system set forth in claim 1 in which said bremsstrahlung detector comprises an ionization chamber.

3. A system for conveying an intelligence signal from one point to another in a space region comprising a transmitter at one of said points including a nuclear source providing a beam of beta radiation, a target mounted in the path of said beam and adapted to generate bremsstrahlung upon bombardment of the atomic nuclei in said target by the beta particles in said beam; a shutter adapted to intercept a variable portion of said beta radiation beam between said beta radiation source and said target, means for moving said shutter relative to said beam to vary said portion, and means for driving said shutter moving means back and forth in accordance with said intelligence signal so as to modulate the intensity of said beta radiation beam incident on said target in accordance with said intelligence signal whereby in turn the intensity of said bremsstrahlung is modulated in accordance with said signal; and a receiver at the other of said points including a detector for said bremsstrahlung radiation for demodulating the same to obtain said intelligence signal.

4. A system for conveying an intelligence signal from one point to another in a space region comprising a transmitter at one of said points including a nuclear source providing a beam of beta radiation, a target mounted in the path of said beam and adapted to generate bremsstrahlung upon bombardment of the atomic nuclei in said target by the beta particles in said beam, means for producing a variable electric field for deflecting said beta particles in said beam between said source and said target, means for modulating said variable field producing means in accordance with said intelligence signal so as to vary said deflection, thereby modulating the portion of the energy of said beta radiation beam incident on said target in accordance with said intelligence signal whereby in turn the intensity of said bremsstrahlung is modulated in accordance with said signal, and a receiver at the other of said points including a detector for said bremsstrahlung radiation for demodulating the same to obtain said intelligence signal.

5. A system for conveying an intelligence signal from one point to another in a space region comprising a transmitter at one of said points including a nuclear source providing a beam of beta radiation, a target mounted in the path of said beam and adapted to generate bremsstrahlung upon bombardment of the atomic nuclei in said target by the beta particles in said beam, means for producing a variable magnetic field for deflecting said beta particles in said beam between said source and said target, means for modulating said variable field producing means in accordance with said intelligence signal so as to vary said deflection, thereby modulating the portion of the energy of said beta radiation beam incident on said target in accordance with said intelligence signal whereby in turn the intensity of said bremsstrahlung is modulated in accordance with said signal, and a receiver at the other of said points including a detector for said bremsstrahlung radiation for demodulating the same to obtain said intelligence signal.

6. A system for conveying an intelligence signal from one point to another in a space region comprising a transmitter at one of said points including a nuclear source providing a beam of beta radiation, a target mounted in the path of said beam and adapted to generate bremsstrahlung upon bombardment of the atomic nuclei in said target by the beta particles in said beam, means for mounting said source for movement relative to said target, means for varying the position of said source in accordance with variations in said intelligence signal so as to modulate the portion of said beta radiation beam incident on said target in accordance with said intelligence signal whereby in turn the intensity of said bremsstrahlung is modulated in accordance with said signal, and a receiver at the other of said points including a detector for said bremsstrahlung radiation for demodulating the same to obtain said intelligence signal, and means connected to said detector for indicating said intelligence signal.

References Cited in the file of this patent

UNITED STATES PATENTS

| | | |
|---|---|---|
| 1,709,809 | Rashevsky | Apr. 16, 1929 |
| 2,546,984 | Deloraine et al. | Apr. 3, 1951 |
| 2,790,945 | Chope | Apr. 30, 1957 |
| 2,999,935 | Foster | Sept. 12, 1961 |